(12) United States Patent
Gill et al.

(10) Patent No.: US 7,633,700 B2
(45) Date of Patent: Dec. 15, 2009

(54) METHOD AND SYSTEM FOR CONTIGUOUSLY APPENDING DATA ONTO MEDIA IN A TAPE DRIVE SYSTEM

(75) Inventors: Richard A. Gill, Arvada, CO (US); Roger D. Hayes, Denver, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 521 days.

(21) Appl. No.: 11/454,496

(22) Filed: Jun. 16, 2006

(65) Prior Publication Data

US 2007/0291391 A1    Dec. 20, 2007

(51) Int. Cl.
*G11B 19/02* (2006.01)
(52) U.S. Cl. .................... 360/72.1; 360/48
(58) Field of Classification Search ............... None
See application file for complete search history.

(56) References Cited

U.S. PATENT DOCUMENTS

| | | | | |
|---|---|---|---|---|
| 5,793,552 A | * | 8/1998 | Howell | 360/72.2 |
| 6,124,993 A | * | 9/2000 | Hallamasek | 360/48 |
| 6,301,067 B1 | * | 10/2001 | Takayama | 360/48 |
| 6,366,418 B1 | * | 4/2002 | McEwen et al. | 360/48 |
| 6,898,036 B2 | | 5/2005 | Gill et al. | |
| 7,224,545 B2 | * | 5/2007 | Saliba et al. | 360/69 |
| 2001/0046099 A1 | | 11/2001 | Hamai et al. | |
| 2004/0260861 A1 | | 12/2004 | Serizawa et al. | |
| 2007/0043773 A1 | | 2/2007 | Tsuji | |

FOREIGN PATENT DOCUMENTS

| | | |
|---|---|---|
| JP | 61222069 | 10/1986 |
| JP | 09035418 | 2/1997 |

* cited by examiner

*Primary Examiner*—Jason C Olson
(74) *Attorney, Agent, or Firm*—Dorsey & Whitney LLP

(57) ABSTRACT

A method for contiguously appending data onto media in a tape drive system is disclosed. In one embodiment, the method includes reading existing data recorded on a media, determining an append point on the media, and contiguously appending new data on the media starting at the append point such that any end pad is eliminated and no intermediate pads are resulted. Other embodiments are also disclosed.

16 Claims, 12 Drawing Sheets

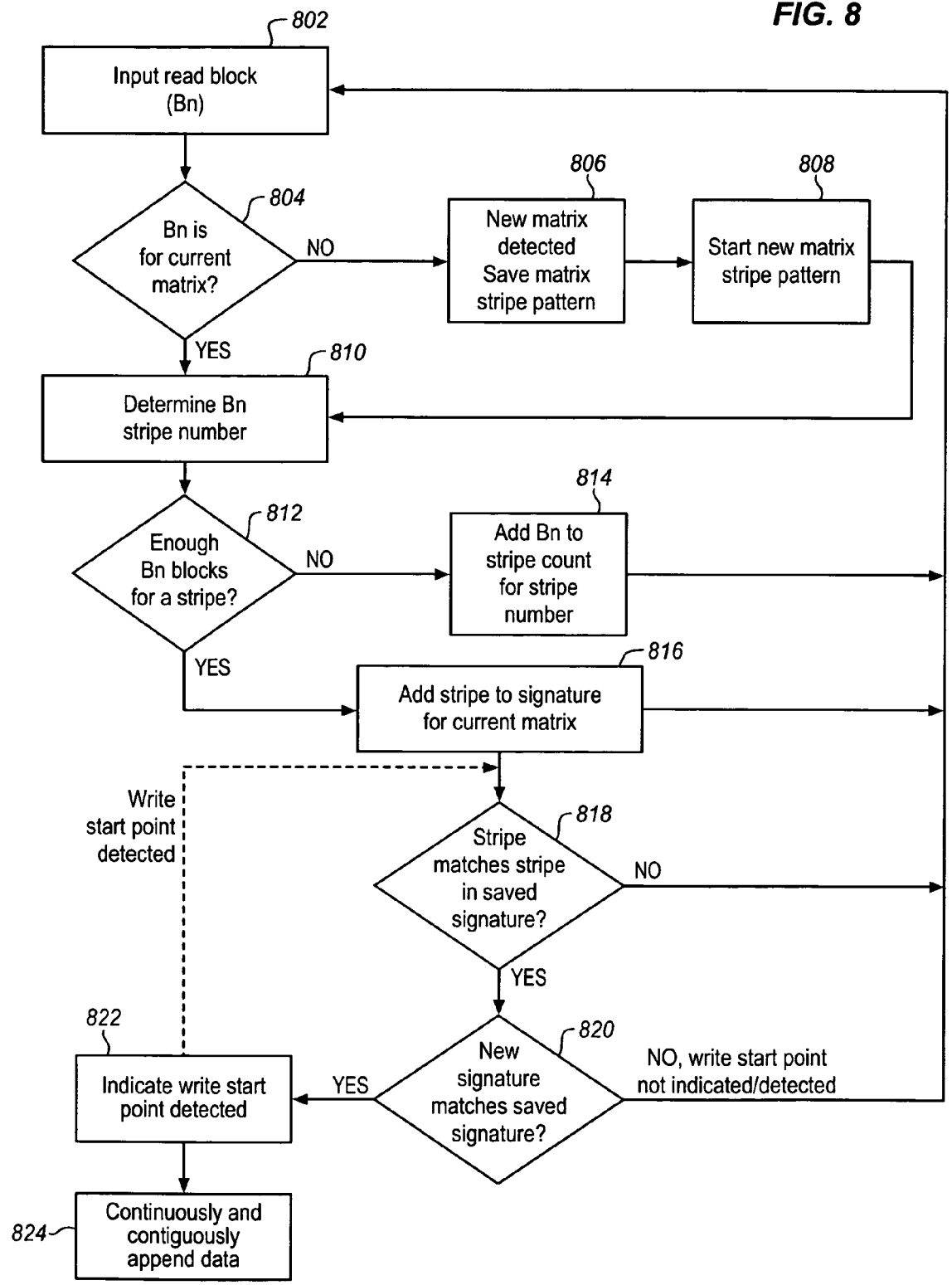

METHOD AND SYSTEM FOR CONTIGUOUSLY APPENDING DATA ONTO MEDIA IN A TAPE DRIVE SYSTEM

FIELD

An embodiment of the invention relates to tape recording, and more specifically, to contiguously appending data onto media in a tape drive system.

BACKGROUND

Presently, magnetic tapes are used for storage, backup, archiving, and subsequent retrieval of data. Currently, data is written onto magnetic tapes in blocks separated by gaps. These gaps delimit blocks and assist in finding the beginning and ending of a particular block during read operations. Currently, data is written onto the tape in blocks with gaps in between with each starting and stopping of the data.

There are conventional approaches to set gap spacing when appending data onto tape; however, they do not eliminate or significantly reduce gaping. Further, the conventional approaches require the gaps to exist between recording blocks to provide a region for appending new data blocks and for other various reasons. Recording gaps present problems when, for example, the recording fails. Additionally, these gaps occupy media space and thus consume potential data capacity.

Other more advanced measures (e.g., interleave re-write on-the-fly recovery measures) can present a different set of gaping-related problems, particularly when appending data in mid-tape. For example, recording blocks include collective sets of smaller blocks that are grouped for error correction reasons and through advanced re-write on-the-fly techniques these collective sets get mixed up for several blocks. Thus, a problem arises when a specific record is to be located in a block to begin writing new data.

Furthermore, in conventional systems, a typical tape control system operates within the dimensions of a recording gap that is left on the tape. Also, the tape control system can position too early and overwrite the intended block that is to be appended. This complicates the tape control system, leaving behind missing data that is undetectable on a write.

FIG. 1 illustrates a prior art gaping on a tape 100. As illustrated, tape 100 includes a number of records 102, 104 that are packaged together with a leading block metadata called the header 106, 108 and a trailing block metadata called the trailer 110, 112 and placed on tape 100. Each record 102, 104 contains data that is to be saved, archived, and/or retrieved. Each head 106, 108 contains metadata to describe and/or support the data saved as records 102, 104 on tape 100. Each tail 110, 112 contains a cyclical redundancy character (CRC) which represents a numerical check on the data to determine missing or lost data by matching relevant numerical values. Such numerical check may be referred to as CRC check (CRCC). However, as illustrated, between each record 102, 104 and more specifically between head, H2, 108 and tail, T1, 110 there is the illustrated gap 114.

Such gaps 114 are present between each record 102, 104, wasting valuable space on tape 100. Furthermore, with improving technology, as the density of tapes 100 increases (e.g., smaller, but greater number of records 102, 104 are placed on tape 100), these gaps 114 are becoming proportionally larger (e.g., with respect to the size of each record 102, 104). A Gap 114 can also compromise the accuracy of records 102, 104 by causing bumps, overwrite and/or false start of records 102, 104. Various techniques have been used to have fewer gaps 114 (e.g., by putting more records 102, 104 on a finite tape 100 or continuous moving of tape 100 despite errors, such as with the on-the-fly technique); nevertheless, gaps 114 and gap-related problems persist. Furthermore, gaps 114 become even more complex to maintain when the recording on the tape is done in serpentine style. Serpentine refers to writing a set of tracks on one pass down a tape and later writing a next set of tracks adjacent to the previous set.

SUMMARY

According to one embodiment, a method for contiguously appending data onto media in a tape drive system is disclosed. The method includes reading existing data recorded on a media, determining an append point on the media, and contiguously appending new data on the media starting at the append point such that any end pad is eliminated and no intermediate pads are resulted.

Other embodiments are also disclosed. Further, the above attributes may be implemented using a computer program, a system, or an apparatus, or any combination thereof. These and other details of one or more embodiments of the present invention are set forth in the accompanying drawings and in the description below.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one

FIG. 8 illustrates an embodiment of a process for gathering a signature and for determining the next write starting point.

DETAILED DESCRIPTION

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Figure 1:
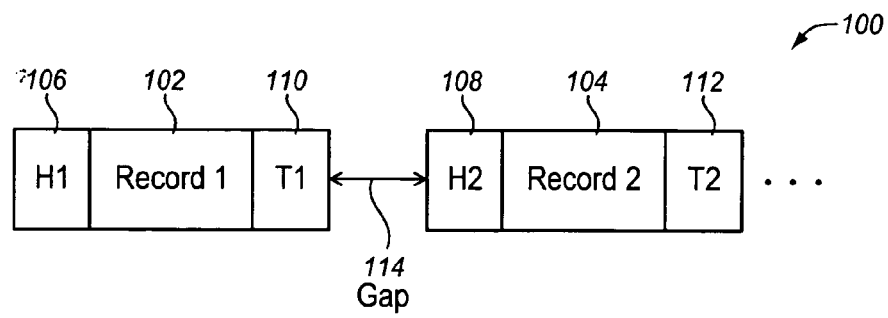
FIG. 1 illustrates a prior art tape.
Figure 2:
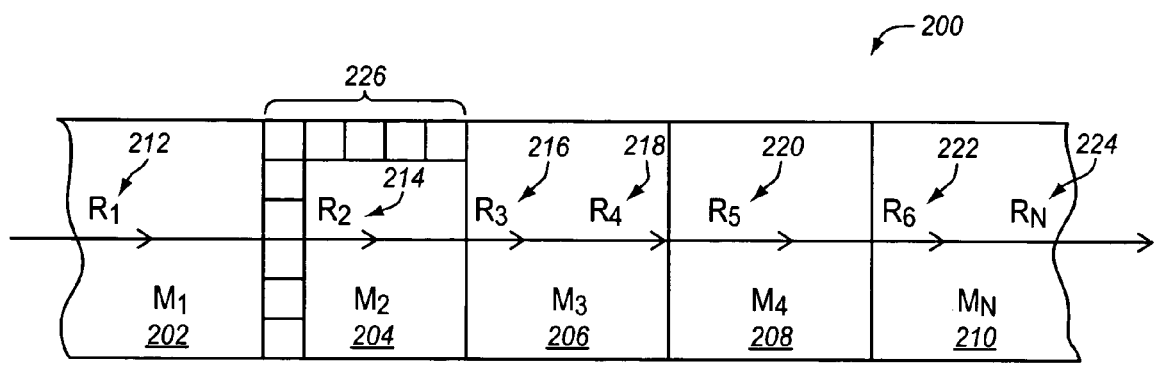
FIG. 2 illustrates an embodiment of a portion of a tape having contiguously appended data.

FIG. 2 illustrates an embodiment of a portion of a tape having contiguously appended data. Tape 200, such as a magnetic tape, is illustrated as having contiguous matrices 202-210. The contiguous matrices 202-210 are next to each other such that there are no gaps between matrices 202-210. Furthermore, the contiguous nature of matrices 202-210 allow for tape 200 to have contiguous data. For example, records 212-224 are embedded on the tape 200 such that they are contiguously provided without any gaps. In one embodiment, each matrix 202-210 may be divided into smaller 32×32 blocks 226 and contain both the data and error correction overhead (ECC) of what is contained in records 212-224. However, it is contemplated that these numbers are changeable as necessary or desired. In one embodiment, the need to pre-block records for the purpose of reducing gaps is eliminated and instead, a contiguous stream of matrices 202-210, records 212-224, and the data is provided.

In one embodiment, as illustrated, matrices 202-210 are places next to each other such that there are no gaps between the matrices 202-210, which allows for not only a continuous space, but also a contiguous space in which to place data. This technique eliminates the need to have a gap after and before each record. As illustrated, records 212-224 are place in a continuous and contiguous form without any gaps. For example, record 2 (R2) 214 starts in matrix 1 (M1) 202 and ends in matrix 2 (M2) 204. Another record, record 3 (R3) 216, starts from where R2 214 ended. R3 216 continuously and contiguously runs into the next matrix, matrix 3 (M3) 206, which is where it ends. Furthermore, this technique eliminates the need for having device blocks. In one embodiment, also eliminated are any device block headers and device block trailers since each record 212-224 may have its corresponding header. A trailer, in one embodiment, may not be needed and thus a record 212-224 may not include it. For example, a header may include the trailer information (e.g., CRCC), eliminating the need for having a trailer.

Although not illustrated, in on embodiment, each record 212-224 may have a header and a trailer associated with it. The header may include metadata to describe the data or information contained in the corresponding record. The trailer may be used to provide a numerical check (e.g., CRCC) of the data to determine missing or lost data by matching relevant numerical values. Furthermore, tape 200 may also contain media information region (MIR) to include other relevant information, such as data identification information, data placement information, data defects and error information, etc. At the each end of tape 200, there may be left a pad when, for example, the matrix space remains unused or contains irrelevant data when the data string has run out or when the physical tape has run out. In one embodiment, these pads are reused or eliminated when appending data in a contiguous recording format on tape 200 as described elsewhere in this document.

Figure 3:
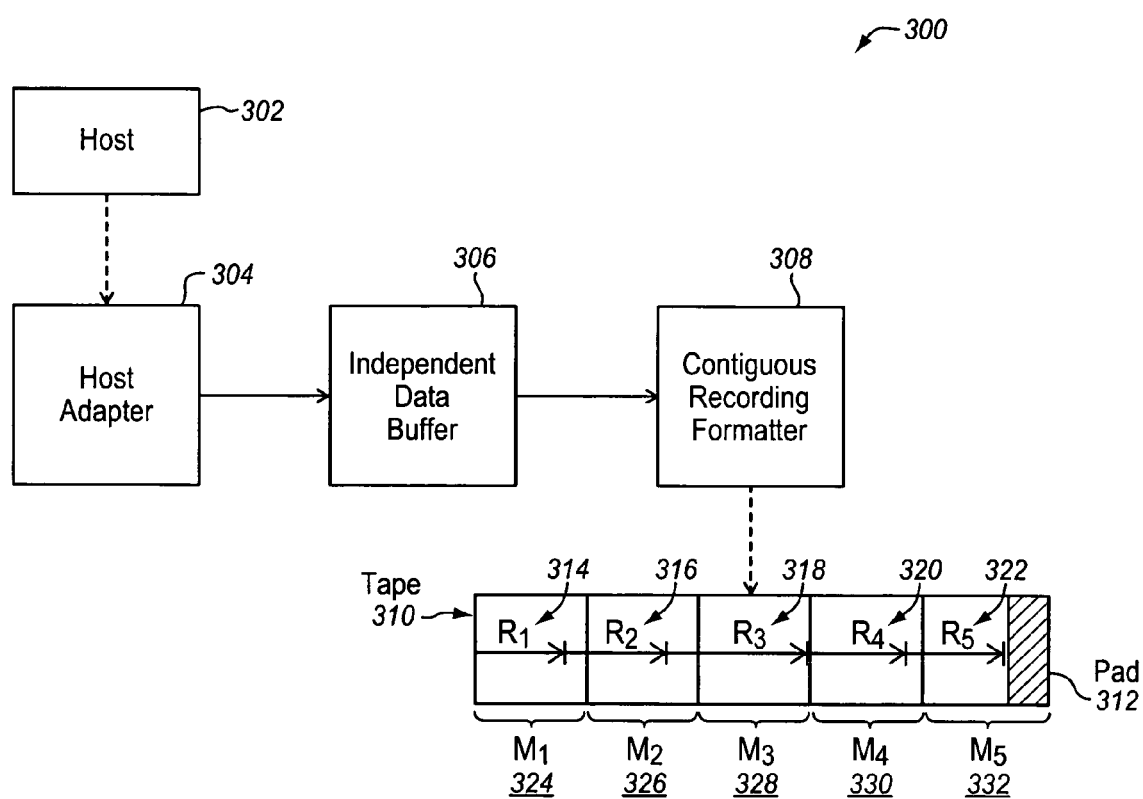
FIG. 3 illustrates an embodiment of a mechanism for contiguously appending data onto a tape.

FIG. 3 illustrates an embodiment of a mechanism 300 for contiguously appending data onto a tape 300. In the illustrated embodiment, mechanism 300 provides contiguous appending of data that not only eliminates gaps by placing matrices 324-332 together, but also eliminates intermediate pads by providing a contiguous and continues placing of records 314-322 in those matrices 324-332.

In one embodiment, host adapter 304 receives data from host 302. Host adapter 304 then sends the data out to independent data buffer (data buffer) 306. Data buffer 306 stores the data received from host adapter 304 and can get filled up with records containing the data. These records are then provided to contiguous recording formatter (recording formatter) 308 to place on to tape 310. In one embodiment, independent data buffer 306 represents a new data buffer that is independent of super-blocking. Data buffer 306 provides the records of data to contiguous recording formatter 308 independent of the size or quantity or number of records provided to the record formatter 308. Stated differently, for example, without the super-blocking-dependency (e.g., depending on the need to pre-block records for the purpose of reducing gaps), data buffer 306 is not limited to providing records in a whole number or a particular size or in a certain pattern to be evaluated by the conventional recording formatter. Further, data buffer 306 includes headers that contain metadata, such as, but not limited to, record number, record size, CRCC over data, and information on whether any of the data is compressed and/or encrypted.

Once such records are received from data buffer 306, recording formatter 308 accepts the records, however they are presented by data buffer 306, and places them onto tape 310 as records R1-R5 314-322. These records 314-322, as illustrated, as continuously and contiguously placed onto tape 310 such that they flow and overflow (e.g., record R3 318 at matrices M2 and M3 326, 328) within contiguously placed matrices 324-332. In one embodiment, although the contiguous placing of matrices 324-332 and appending of records 314-322 onto tape 310 eliminates any gaps and pads, respectively, there may, however, be a pad 312 at the end of the data stream. Stated differently, only when the data stream ends or when the data has run out, leaving some unused space within the matrix 332 where the data ended (e.g., some of 416K space is still available) that there might be a pad 312. Even so, in one embodiment, pad 312 is eliminated when additional records as appended to tape 310 starting at the point where the data stream ended as described elsewhere in this document. By eliminating pad 312, all matrices are fully used and no capacity of any matrices 324-322 is lost.

Figure 4:
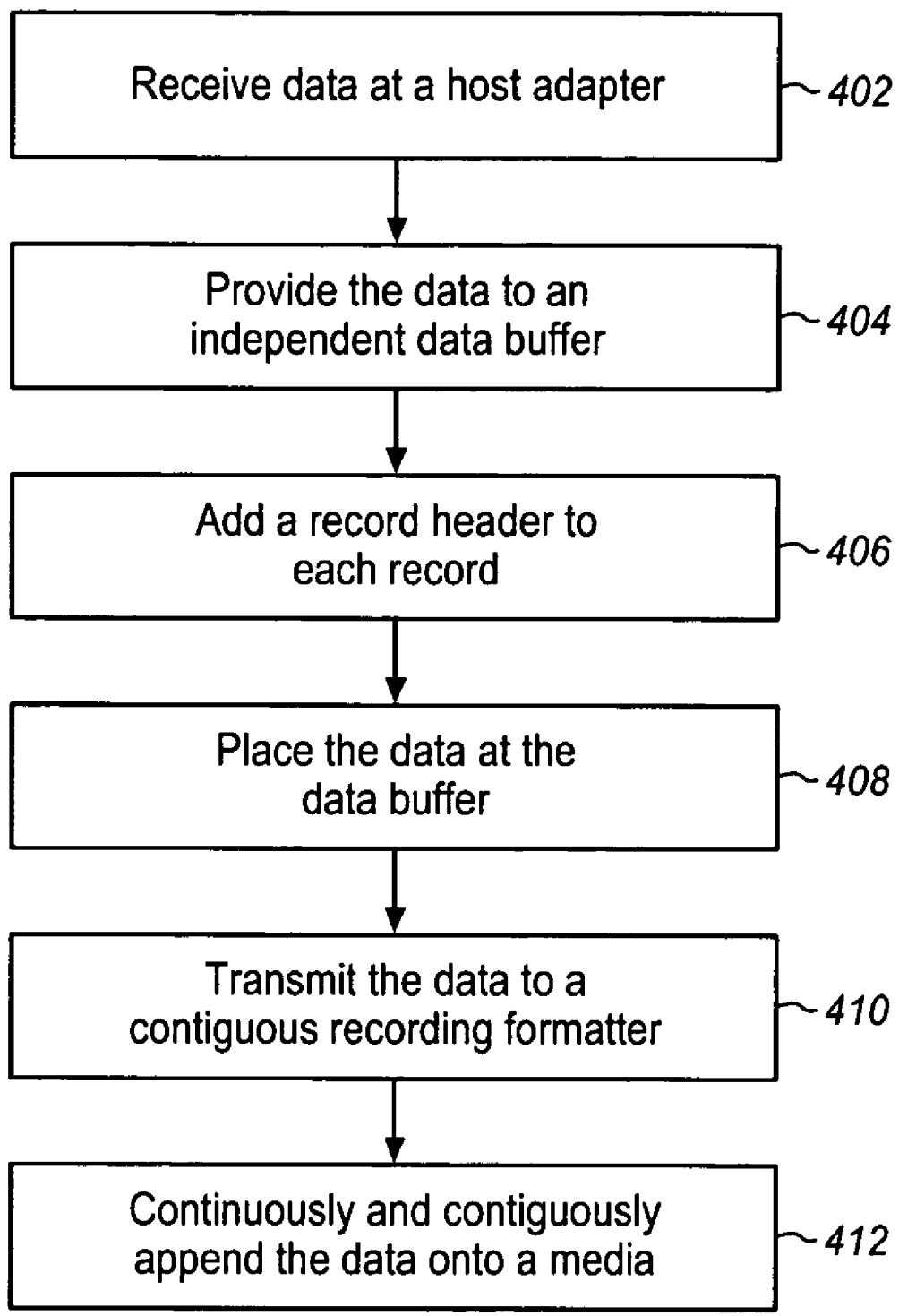
FIG. 4 illustrates an embodiment of a process for contiguously appending data onto a tape.

FIG. 4 illustrates an embodiment of a process for contiguously appending data onto a tape. At processing block 402, data is received at a host adapter from one or more hosts in communication with the host adapter. The data is then provided to an independent data buffer by the host adapter at processing block 404. The providing of the data further includes adding a record header to each record at processing block 406. The record header may contain metadata, such as, but not limited to, record number, record size, CRCC over data, and information on whether any of the data is compressed and/or encrypted. The data that is compressed and/or encrypted may be optionally compressed and/or encrypted. The data (e.g., data and metadata) is then placed at the data buffer at processing block 408. The data buffer then transmits the data to a contiguous recording formatter independent of the size or form in which the data is transmitted to the recording formatter at processing block 410. At processing block 412, the recording formatter continuously and contiguously appends the data onto the tape such that any gaps and/or pads are eliminated from the tape.

Figure 5A:
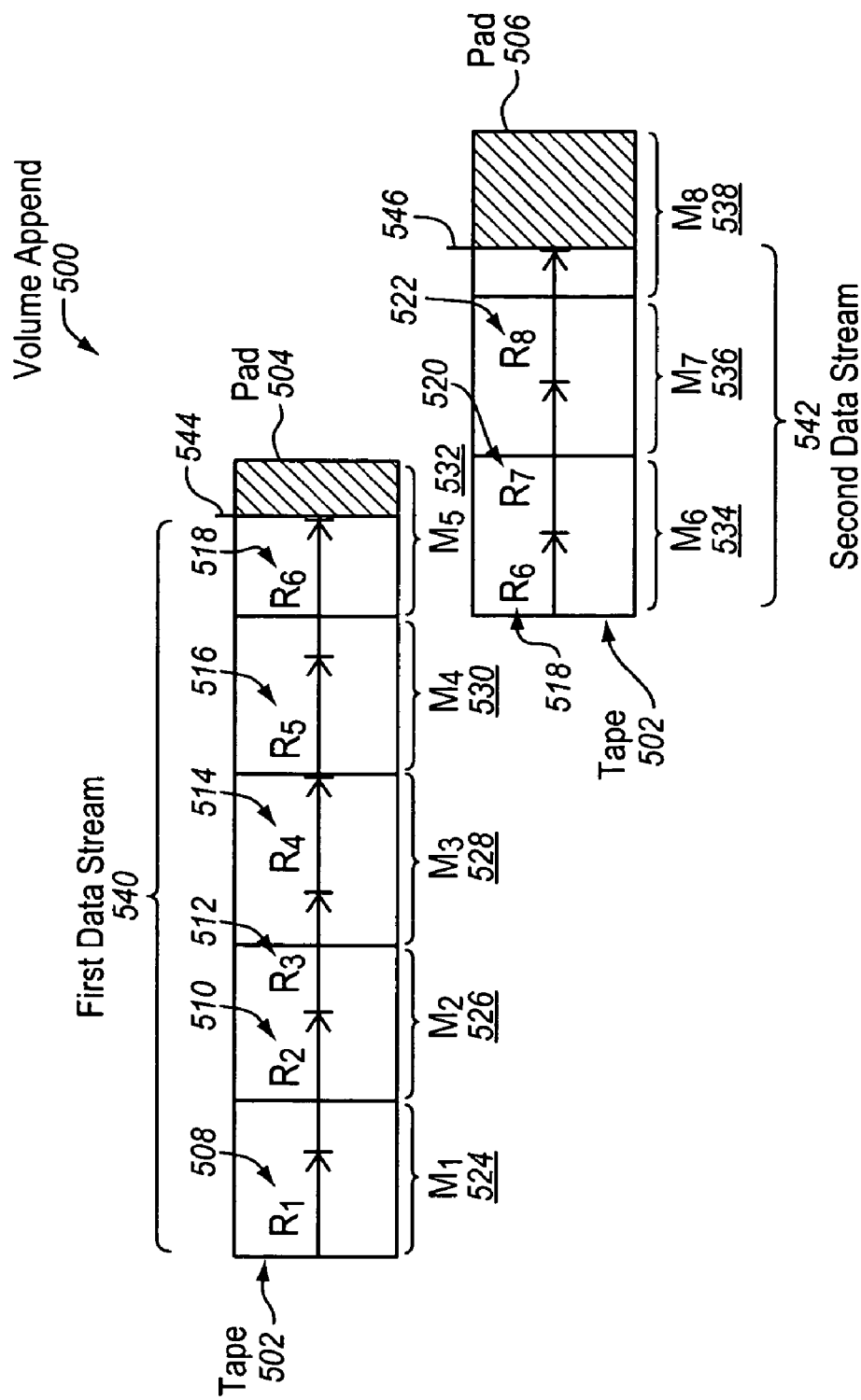
FIG. 5A illustrates an embodiment of a mechanism for volume appending.

FIG. 5A illustrates an embodiment of a mechanism 500 for volume appending. Although, embodiments of the present invention eliminate intermediary pads by providing contiguous and continuous appending of data on to tape 502, there may still remain a pad, such as pad 504, at the end of the data stream or when the data has run out. In one embodiment, to provide maximum efficiency and use of tape 502 (e.g., each pad 504 on average could waste about half of a matrix 532), pad 504 is reused by appending the new data exactly where the last data stream ended.

In the illustrated embodiment, first data stream 540 includes records R1-R6 508-518 which fully occupy matrices M1-M4 524-530 and only partially occupy matrix M5 532. The partial use of matrix 532 is due to the reason that the first data stream 540 ended with its last record 518 at about a mid-point of matrix 532, which resulted in pad 504. To use the space left virtually unused by pad 504 in matrix 532, an embodiment of the volume appending mechanism 500 is applied. In one embodiment, second data stream 542 is appended at location 544 where the first data stream 540 ended. For example, record R7 520, which is the first record of second data stream 542, is appended at location 544 where record R6 518, which is the last record of first data stream 540, ended. This mechanism 500 of volume appending eliminates pad 504 that is generated at the end of first data stream 540 by reusing the area occupied by pad 504. Similarly, pad 506 is generated when the second data stream 542 ends in matrix 538, but the matrix area occupied by that pad 506 is also reused when additional data from a third data stream is appended at location 546 where record 522 ends.

In one embodiment, the data is read from one or more matrices, such as matrices M3 and M4 528, 530, located prior to the location 544 where the last record R6 518 ended as part of the first data stream 540. This is to verify that no data (e.g., records R1-R6 508-518) is mistakenly or accidentally overwritten. In one embodiment, location 544 is determined using a pattern of stripes that are detected from the read of the written data on the tape 502 up to the last matrix M4 530 prior to matrix M5 532 where the new data is to be appended. This pattern of stripes is referred to as signature, as described elsewhere in this document. At location 546, new data starting with the first record R7 520 of the second data stream 542 is written onto tape 502. This way, none of the old data is overwritten and none of the pad 544 remains.

Figure 5B:
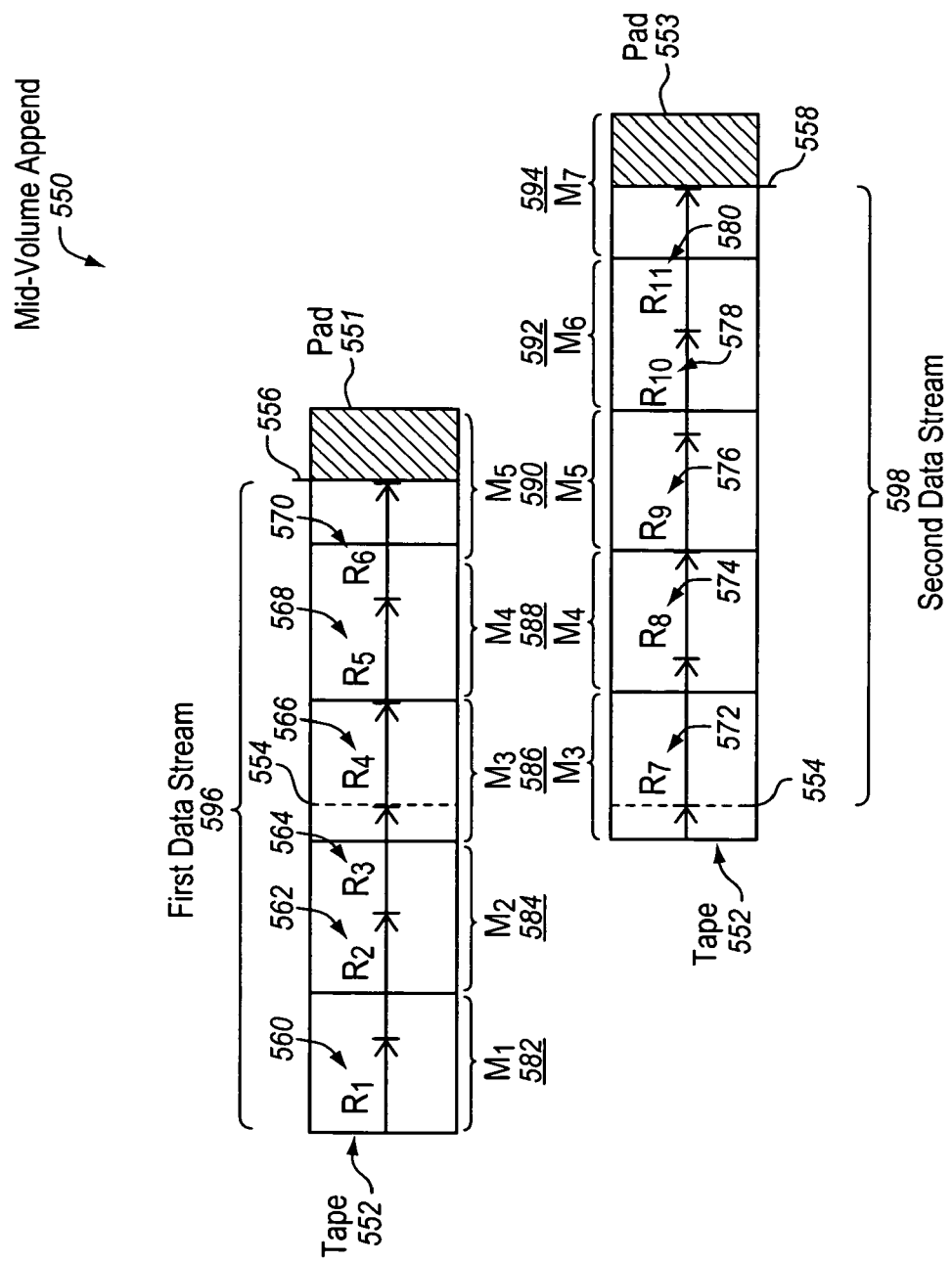
FIG. 5B illustrates an embodiment of a mechanism for mid-volume appending.

FIG. 5B illustrates an embodiment of a mechanism 550 for mid-volume appending. The illustrated embodiment of a mid-volume append mechanism 550 provides for appending of data at a mid-point onto tape 552, as opposed to at the end as is the case with volume append (FIG. 5A). In one embodiment, for example, the data starting with record R4 566 is to be rewritten. Record 566, as illustrated, is not at the end of the tape 552 near pad 551, but instead at some other location 554 on the tape 552. For example, records R1-R3 560-564 of the first data stream 596 are to be kept on tape 552, while records R4-R6 566-570 are to be overwritten with new data (e.g., "cases pending" are to be replaced with "new cases"). At location 554, where record R3 564 ends, records R7-R11 572-580 of the second data stream 598 are placed. This mechanism 550 not only overwrites records R4-R6 566-570 with records R7-R11 572-580 starting at matrix M3 586, but also rids pad 551 at matrix M5 590. However, a new pad 553 may result at matrix M7 594 at the end of the last record R11 580 of the second data stream 598.

In one embodiment, the data is read from one or more matrices, such as matrices M1 and M2 528, 584, located prior to the location 554 from where the new data is to be appended onto tape 552. This is to verity that no data that is to remain (e.g., records R1-R3 560-564) is mistakenly or accidentally overwritten. In one embodiment, location 554 is determined using a pattern of stripes that were detected from the read of the written data on the tape 552 from the or up to the last matrix M2 584 prior to matrix M3 586 where the new data is to be appended. This pattern of stripes is referred to as signature, as described elsewhere in this document. At location 554, new data starting with the first record R7 572 of the second data stream 598 is written. This way, none of the data that is to remain overwritten.

Figure 6:
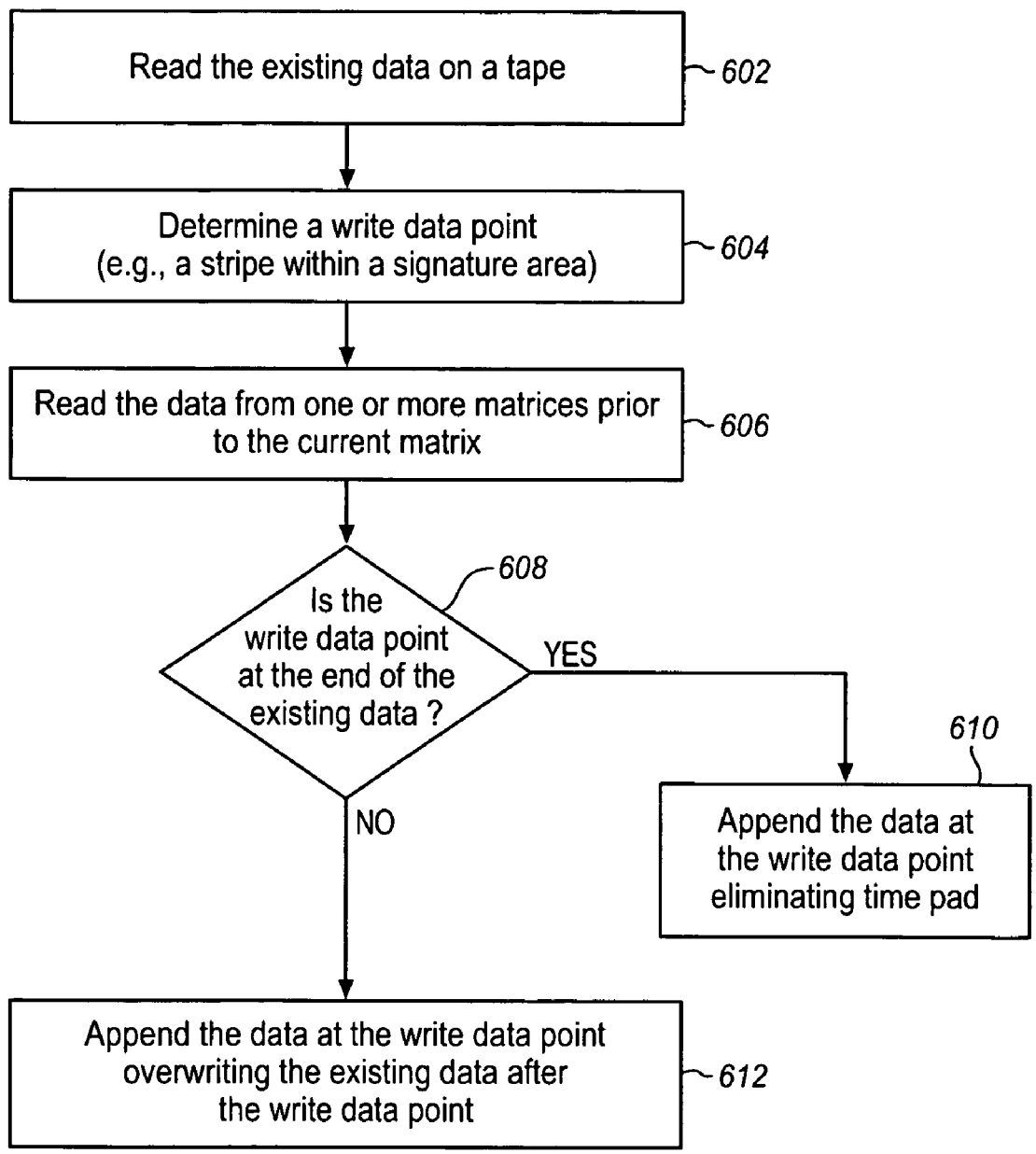
FIG. 6 illustrates an embodiment of a process for appending data onto a tape using a volume append mechanism and/or a mid-volume append mechanism.

FIG. 6 illustrates an embodiment of a process for appending data onto a tape using a volume append mechanism and/or a mid-volume append mechanism. At processing block 602, existing data from a tape is read. At processing block 604, a write data point (point) within the existing data on the tape is determined. The write data point refers to a starting point at which new data is appended. In one embodiment, the write data point is determined using signature information as described with reference to FIGS. 7B-10. In one embodiment, data from one or more matrices prior to the current matrix (e.g., the matrix where the write data point exists) is read at processing block 606. The data from these matrices is read so that the existing data is not only verified, but also so it is protected and preserved from potential overwriting when the new data is appended.

At decision block 608, a determination is made as to whether the write data point is at the end of the existing data on the tape. If the write data point is at the end of the existing data, there is likely to be a pad following the point within the current matrix. If the write data point is at the end, the new data is appended starting at the point such that the area of the matrix occupied by the pad is reused, while protecting the existing data from any potential overwriting at processing block 610. This technique is referred to as volume appending.

Referring back to decision block 608, if the write data point is within the existing data (e.g., if some of the existing data is to be overwritten), the new data is appended starting at the point such that the existing data that is to be overwritten is overwritten with the new data while preventing the rest of the existing data from being overwritten at processing block 612. This technique is referred to as mid-volume appending.

Figure 7A:
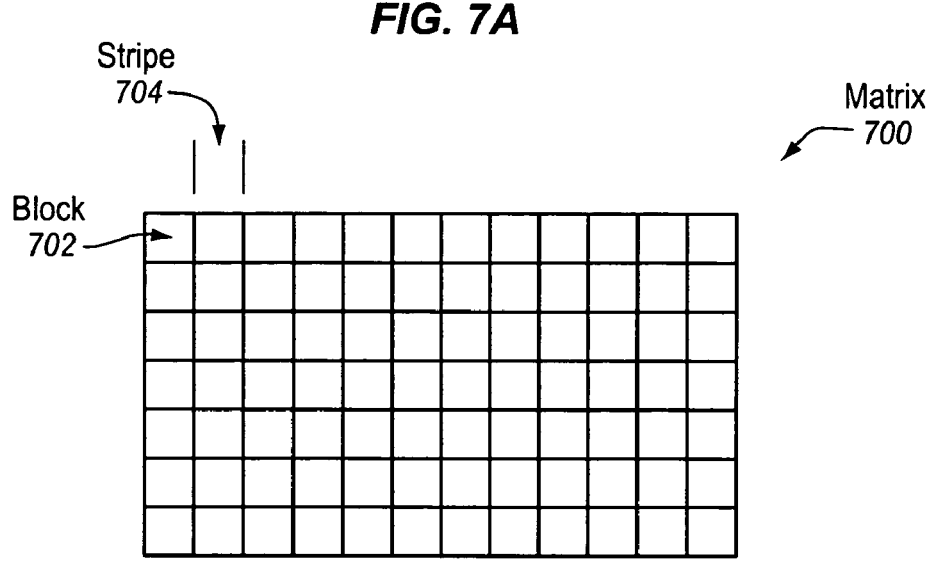
FIG. 7A illustrates an embodiment of a matrix.

FIG. 7A illustrates an embodiment of a matrix 700. In one embodiment, as illustrated, matrix 700 includes a number of smaller entities referred to as blocks 702. For example, a matrix 700 may consists of several blocks 702, such as blocks 1 to $N_m$. Stripes 704 in the matrix 700 serve as sections 704 comprising of blocks 702, such as section 704 comprising a stripe of blocks 702 from 1 to $N_s$ blocks in a vertical section 704 of the matrix 700. In a sequential recording format, data is separated into blocks 702 and written on to a media (e.g., a magnetic tape) in matrix structure as further described with reference to FIG. 7B.

Figure 7B:
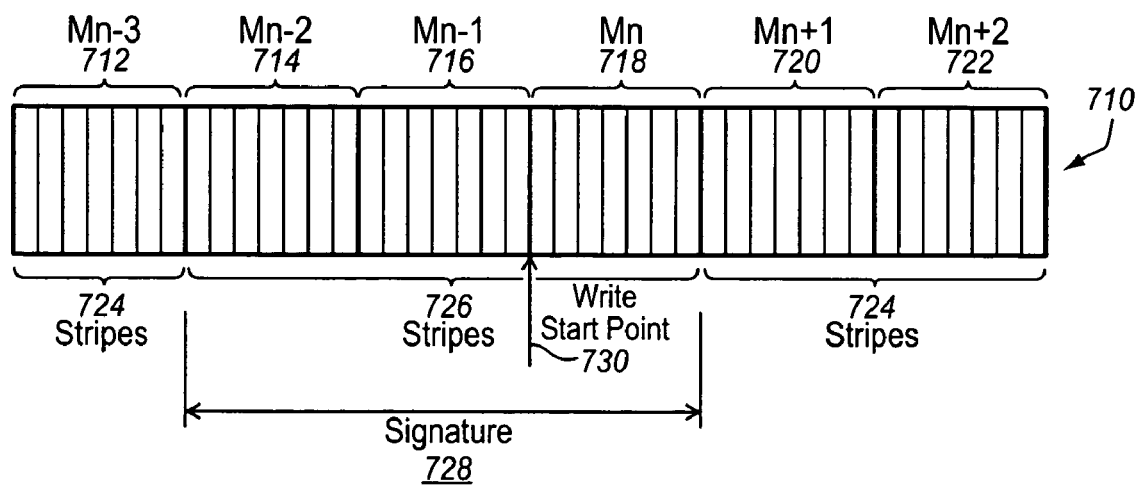
FIG. 7B illustrates an embodiment of a tape having signature usage information.

FIG. 7B illustrates an embodiment of a tape 710 having signature usage information. When a write operation completes, the point or location from where to begin writing the next write operation (e.g., new data) is determined. Further, the current write data (e.g., old data) may have to be preserved and the new write data is to continue as close to the currently written data as possible. Stated differently, whether to append the new data or to volume append the new data or to mid-volume append the new data, a point or location on the media (e.g., a tape) 710 is determined such that the new data is precisely appended starting at that point or location, while preserving the existing data that is to be preserved (e.g., avoid overwriting of the current data). In one embodiment, to achieve this, a pattern of stripes 726 of the written data when the last write operation completed is determined. This pattern is referred to as signature 728 or signature of the write data.

In one embodiment, signature 728 is made up of the pattern of stripes 726 that are detected from the read of the written data from the tape 710 for the last matrix Mn 718 to a number of matrices prior to matrix Mn 718, such as matrix Mn-2 714 (e.g., from Mn to Mn-x, wherein x is the number of matrices written prior to matrix Mn). It is contemplated that "x" can be any number such that signature 728 can be made up of any number of matrices as necessary or desired to increase the detection reliability. In the illustrated embodiment, the number of matrices within signature 728 is three, including Mn-2 714, Mn-1 716, and Mn 718. Also, the read of the written data is used because it is contemplated that not all stripes 726 may be present on tape 710 after the write operation is completed.

Furthermore, the read of the written data may indicate which blocks of the matrices 712-722 are detected. From this block information, the signature stripes 726 are formed and the write pattern is determined. Once the blocks are read, the signature state is saved to be used to determine the next write start point 730. Signature 728 is made up of stripe patterns consisting of stripes 726 for each matrix 714-718 that make up the desired signature 728. When the next write operation occurs, the previously written data for matrices 714-718 is read and the stripe detection is compared to the saved signature 728 to determine when to begin the next write operation. In the illustrated embodiment, the start of the next data write is determined to be at location 730 and the matrix Mn 718 is re-written with new spanning data, while the current data from matrices Mn-2 and Mn-1 714, 716 is preserved and maintained.

FIG. 8 illustrates an embodiment of a process for gathering a signature and for determining the next write starting point. In the illustrated embodiment, blocks 802-816 are regarded as signature gathering functions. This signature gathering continues until a write or read operation completes. When the operation completes, the detected signature is saved for later compare for the next write start point. Blocks 818-822 may be regarded as the extension of the function to determine the write start point. In one embodiment, blocks 802-816 are used for both operations, while blocks 818-822 are used until the write start point is detected. After the write start point is detected, blocks 818-822 may not longer be used for the remainder of the write operation.

Referring now to processing block 802, a read block input is made. At decision block 804, a determination is made as to whether the input read block is at the current matrix. If it is not, a new matrix is detected and the stripe pattern for that matrix is saved at processing block 806. A new matrix stripe pattern is started at processing block 808. Then, the read block stripe number is determined at processing block 810. Similarly, referring back to decision block 804, if the input read block is for the current matrix, the read block stripe number is determined at processing block 810.

At decision block 812, a determination is made as to whether the read blocks are enough for a stripe. If not, the blocks are added to the stripe count for a stripe number at processing block 814 and the process continues with processing block 802. If the read blocks are enough for a strip, the stripe is added to a signature for the current matrix at processing block 816. At decision block 818, a determination is made as to whether the stripe matches the stripe in the saved signature. If not, the process continues with processing block 802. If the stripe matches the stripe saved in the saved signature, a determination is made as to whether the new signature matches the saved signature at decision block 820. If it does not match, then the write start point is not detected and thus, the process may either end or restart with processing block 802. If the new signature matches the saved signature, an indication of write start point is detected at processing block 822. In other words, the point from where the new data is to be appended on the media (e.g., magnetic tape) is known such that when the new data is appended, the current data that is to be maintained is preserved (e.g., not overwritten) and only the data that is to be overwritten is overwritten and/or any excess space (e.g., pad) is reused. Once the write start point detection is indicated, data is continuously and contiguously appended onto tape at processing block 824. Further, once the write start point detection is indicated, the process may continue with decision block 818.

Figure 9:
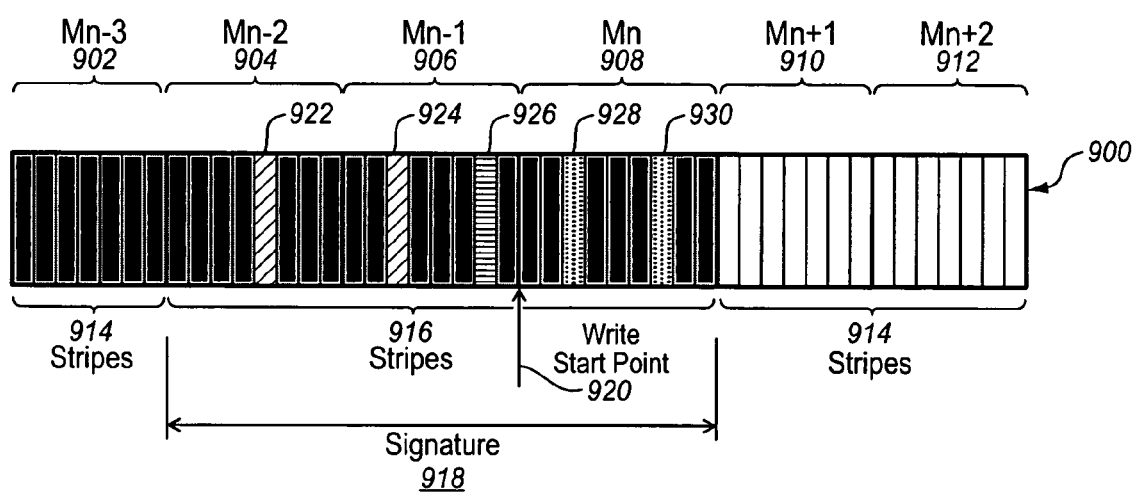
FIG. 9 illustrates an embodiment of a tape having a complex signature information usage.

FIG. 9 illustrates an embodiment of a tape 710 having a complex signature information usage. An even more complex use of signature information may be employed and used when accommodating certain existing technologies. One such technology, for example, is referred to as "progressive write" by Storage Technologies Corporation, now Sun Microsystems Inc., of Louisville, Colo. Progressive write generally refers to recovering from write errors during writing of a moving storage medium suspend write current while allowing the storage medium to continue moving. When this operation of progressive write is introduced to an embodiment of sequential recording format, the signature operation may become more complex such that the signature operation is nevertheless performed efficiently and accurately.

For example, a progressive write method is introduced, such as the method of re-writing of certain stripes (e.g., stripes containing data errors) of previous matrices Mn-3, Mn-2, Mn-1 902-906 are placed into other matrices, such as the current matrix Mn 908. For example, as illustrated stripes 922 and 924, originally of matrix 902, are placed into matrix 904 and matrix 906, respectively. Similarly, stripe 924 of Matrix 904 is placed into matrix 906, while stripes 928, 930 of matrix 906 are placed into the current matrix 908. The resulting media can have interleaved progressive write stripes 922-930. As illustrated, this maneuvering of the data also expands those matrices to which the stripes are added. Of course, it is contemplated that the number of stripes 914, 916 illustrated here are merely examples and that these numbers can greatly vary when dealing with matrices on actual media.

In one embodiment, using the progressive write maneuvering of stripes 922-930 results in the saved signature 918 having progressive written stripes 922-930. This is particularly the case, when the current matrix Mn 908 is overwritten with a data spanning operation. Further, the stripes contained within matrix Mn-1 906 are written on the next operation to maintain the previous write reliability of the matrix 906. The signature operation remains the same as the one described with reference to FIG. 8, with the added detection of progressive written stripes 922-930 within each matrix 904, 906, 908. When progressive written stripes 922-930 are detected, the progressive write stripe number is saved as part of the signature information for the matrices 904, 906, 908 with which the progressive written stripes 922-930 are associated.

During the write start point detection, in one embodiment, progressive written stripes 922-930 are included as part of the detection signature 918. In another embodiment, the signature detection includes merely the non-progressive written stripes (e.g., stripes 916 minus stripes 922-930). The information relating to the saved progressive write stripes 922-930 is then used to indicate which progressive write stripes 922-930 are to be re-written as part of the next write operation.

Progressive written stripes 922-930 may be written before any other new write data on the next operation which enables the new write data to not have progressive write stripes 922-930 from a previous operation interleaved with the new write data.

Figure 10:
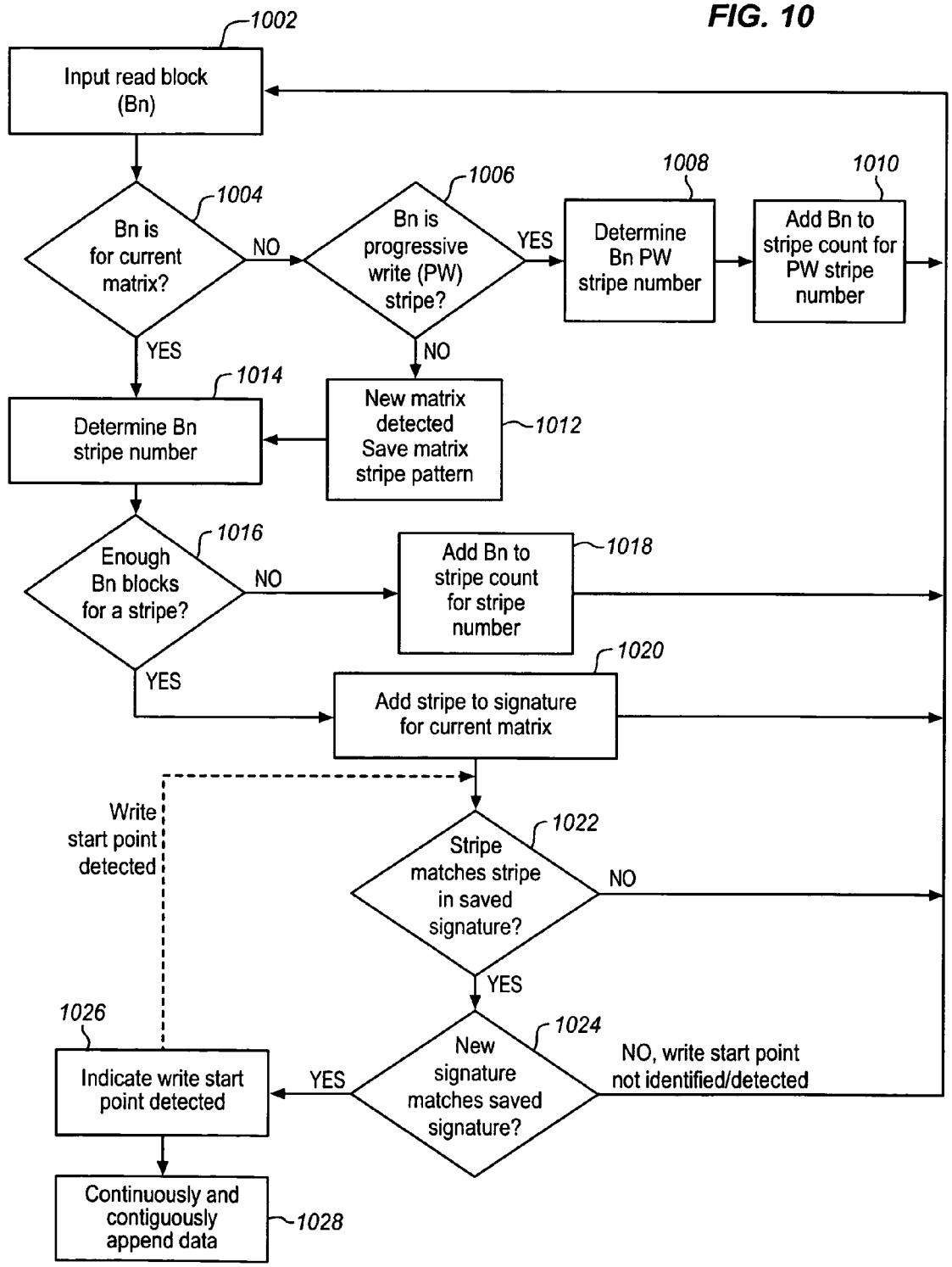
FIG. 10 illustrates an embodiment of a process for gathering a signature and for determining the next write starting point in a complex setup.

FIG. 10 illustrates an embodiment of a process for gathering a signature and for determining the next write starting point in a complex setup. As with FIG. 9, in the illustrated embodiment, blocks 1002-1020 are regarded as signature gathering functions. This signature gathering continues until a write or read operation completes. When the operation completes, the detected signature is saved for later compare for the next write start point. Blocks 1022-1026 may be regarded as the extension of the function to determine the write start point. In one embodiment, blocks 1002-1020 are used for both operations, while blocks 1022-1026 are used until the write start point is detected. After the write start point is detected, blocks 1022-1026 may not longer be used for the remainder of the write operation.

At processing block 1002, a read block input is received. At decision block 1004, a determination is made as to whether the read blocks are for the current matrix. If they are not, a determination is made as to whether the read blocks are regarded as progressive write stripes. If they are regarded as progressive write stripes, progressive write stripe numbers are determined at processing block 1008. The read blocks are then added to the strip count for the progressive write numbers at processing block 1010. If the read blocks are within the progressive write stripes, a new matrix is detected and the matrix stripe pattern is saved at processing block 1012. The process continues with determining the read block stripe numbers at processing block 1014. Similarly, referring back to block 1004, if the blocks are for the current matrix, the process continues with determining the block stripe number at processing block 1014.

At decision block 1016, a determination is made as to whether there are enough blocks for a stripe. If not, the blocks are added to a stripe count for a stripe number at processing block 1018. The process continues with processing block 1002. If, however, there are enough blocks for the stripe, the stripe is added to a signature of the current matrix at processing block 1020. At decision block 1022, a determination is made as to whether the stripe matches the stripe in the saved signature. If it does not match, the process continues with processing block 1002. If the stripe matches the stripe in the saved signature, at decision block 1024, another determination is made as to whether a signature matches the saved signature. If not, the process continues with processing block 1002 as the write start point is not detected. If, however, the new signature matches the saved signature, it indicates that the write start point is detected at processing block 1026. Once the write start point detection is indicated, data is continuously and contiguously appended onto tape at processing block 1028. Further, once the write start point detection is indicated, the process may continue with decision block 1022.

Figure 11:
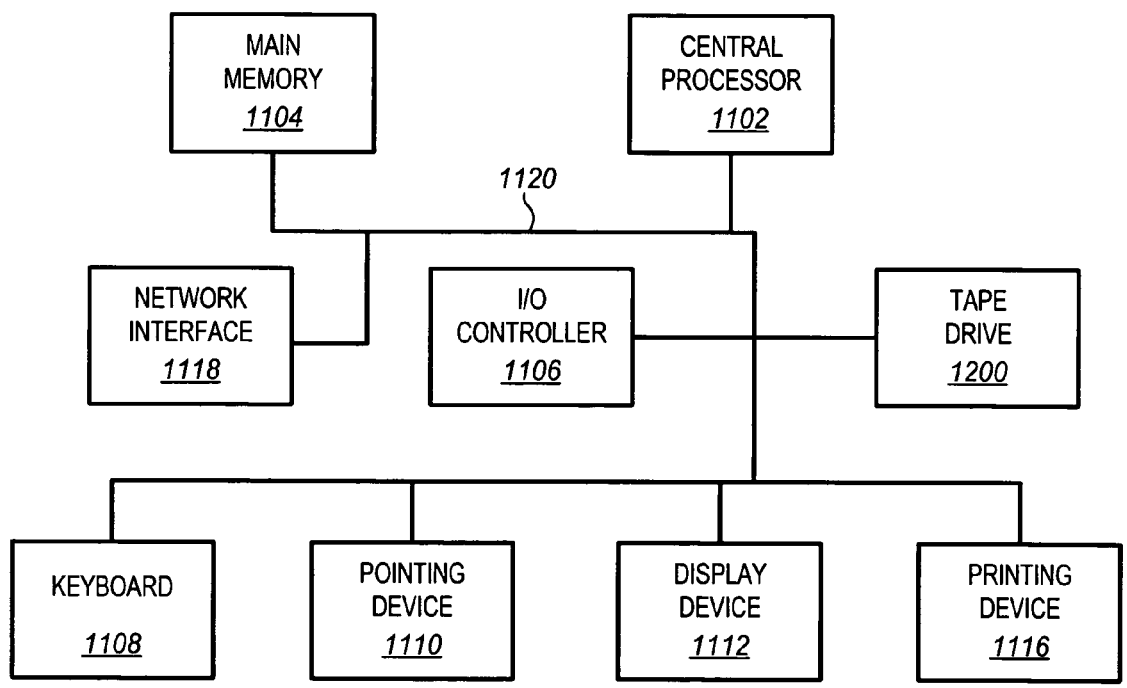
FIG. 11 illustrates an embodiment of a computer system.

FIG. 11 illustrates an embodiment of a computer system 1100. Computer system 1100 comprises a central processor 1102, a main memory 1104, an input/output (I/O) controller 1106, a keyboard 1108, a pointing device 1110 (e.g., mouse, track ball, pen device, or the like), a display device 1112, and a network interface 1118. Additional input/output devices, such as a printing device 1116, may be included in the system 1100 as desired. As illustrated, the various components of the computer system 1100 communicate through a system bus 1120 or similar architecture.

In a further embodiment, computer system 1100 may be a distributed computing system. In other words, one or more of the various components of the computer system 1100 may be located in a physically separate location than the other components of the computer system 1100. Such components may be accessed and connected via a network to the other components.

In one embodiment, computer system 1100 includes a Sun Microsystems computer utilizing a Scalable Processor Architecture (SPARC) microprocessor available from several vendors (including Sun Microsystems, Inc., of Santa Clara, Calif.). Those with ordinary skill in the art understand, however, that any number and type of computer systems may be utilized to provide one or more embodiments of the present invention, including those made by Hewlett Packard of Palo Alto, Calif., and International Business Machines (IBM)-compatible personal computers utilizing Intel microprocessors, which are available from several vendors (including IBM of Armonk, N.Y.).

Also, instead of a single processor 1102, two or more processors (whether on a single chip or on separate chips) can be utilized to provide speedup in operations. It is further envisioned that the processor 1102 may be a complex instruction set computer (CISC) microprocessor, a reduced instruction set computing (RISC) microprocessor, a very long instruction word (VLIW) microprocessor, a processor implementing a combination of instruction sets, and the like.

The network interface 1118 provides the communication capability with a host or other computer systems (as described in previous paragraph) on a same local network, on a different network connected via modems and the like to the present network, or to other computers across the Internet. In various embodiments, the network interface 1118 can be implemented utilizing technologies including, but not limited to, Ethernet, Fast Ethernet, Gigabit Ethernet (such as that covered by the Institute of Electrical and Electronics Engineers (IEEE) 1101.1 standard), wide-area network (WAN), leased line (such as T1, T3, optical carrier 3 (OC3), and the like), analog modem, digital subscriber line (DSL) and its varieties such as high bit-rate DSL (HDSL), integrated services digital network DSL (IDSL), and the like, cellular, wireless networks (such as those implemented by utilizing the wireless application protocol (WAP)), time division multiplexing (TDM), universal serial bus (USB) and its varieties such as USB II, asynchronous transfer mode (ATM), satellite, cable modem, FireWire, and the like.

Moreover, the computer system 1100 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments of the present invention, the computer system 1100 is a general purpose computer capable of running any number of applications such as those available from companies including Oracle, Siebel, Unisys, Microsoft, and the like.

Computer system 1100 may also include a tape drive 1200. Tape drive 1200 may be coupled to I/O controller 1106 via a Universal Serial Bus (USB). However, tape drive 1200 may be coupled to I/O controller 1106 via other types of peripheral interfaces.

Figure 12:
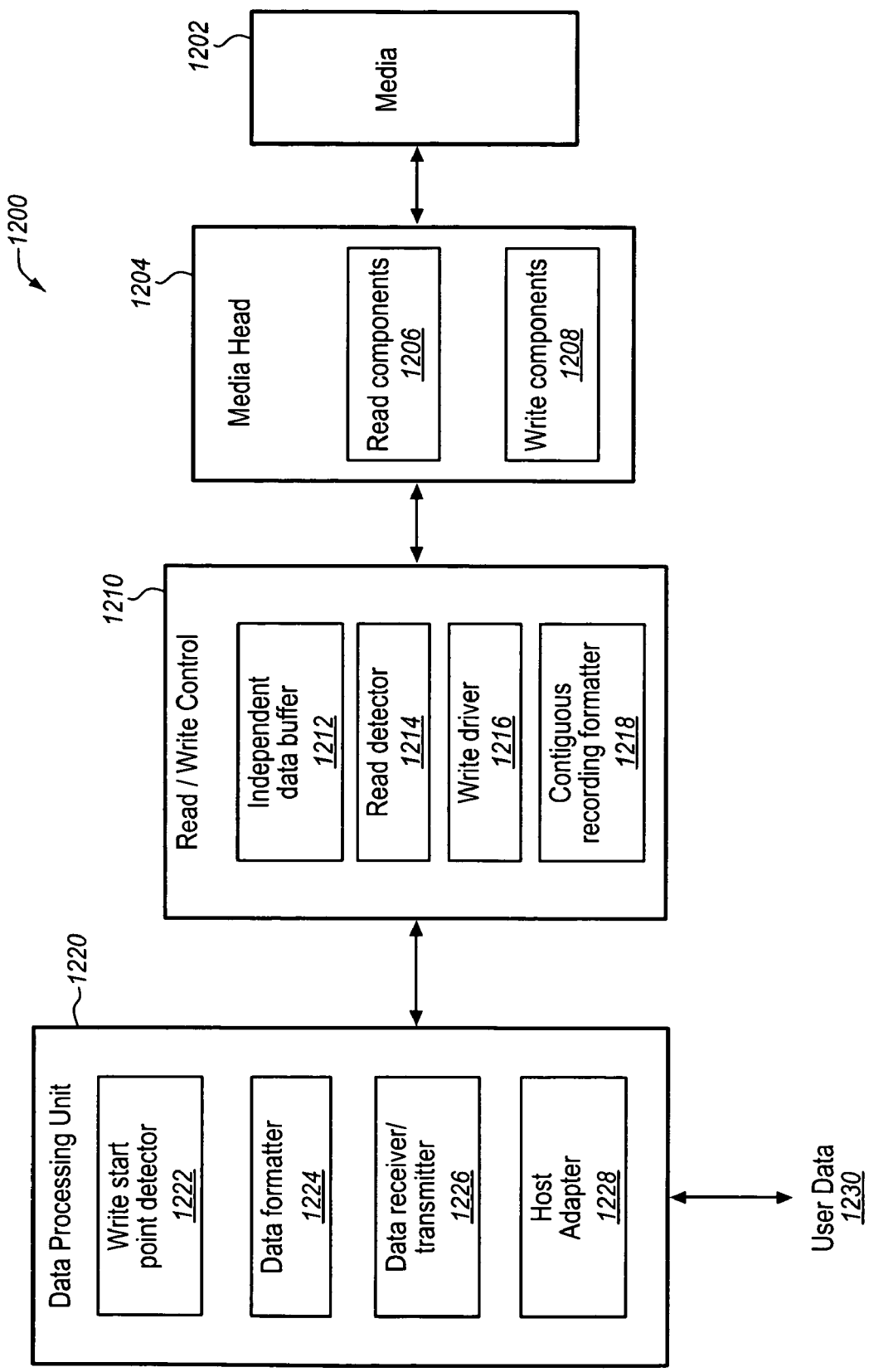
FIG. 12 illustrates one embodiment of a tape drive.

FIG. 12 illustrates one embodiment of a tape drive 1200. Tape drive 1200 includes a digital processing unit 1220, read/write control 1210, tape head 1204, and media 1202. Digital processing unit 1220 receives user write data from I/O controller 1106 that is forwarded for storage, and transmits received read data that is forwarded to I/O controller 1106. Particularly, digital processing unit 1200 includes a data receiver/transmitter 1226 and host adapter 1228. Host adapter 1228 works with data receiver/transmitter 1226 to receive user data 1230 from a host and to forward data to a user as well as transmit data to read/write (R/W) control 1210. Data processing unit 1220 further includes a data formatter 1224 to format and condition data in communication with contiguous recording formatter 1218 at R/W control 1210 to be stored at tape drive 1200. Data processing unit 1220 may further include a data compressor/decompressor to compress and decompress data when communicating the data with a user.

Media 1202 is the physical tape medium on which data is appended and stored. In one embodiment, media 230 is a magnetic tape. Media head 1204 includes a tape head that is an electromagnetic component which reads and writes onto media 1202 as media 1202 passes over it. Media head 220 includes write components 1208 and read components 1206 to perform the write and read operations.

R/W control 1210 controls the reading and writing of data at tape drive 1200. R/W control 1210 includes a read detector 1214 to read data on media 1202 and a write driver to write data on media 1202. Read detector 1214, in communication with write start point detector 1226, is further to read data one or more matrices prior to the current matrix to determine the write start point to preserve the existing data from overwriting, while appending new data starting at the write start point. Independent data buffer 1212 is used to hold data received from data processing unit 1220 and providing data to contiguous recording formatter 1218. Contiguous recording formatter 1218 is to continuously and contiguously append data onto media 1202. It is contemplated that although various component, modules, and/or elements are shown as part of other components, such as write start point detector 1222 at data processing unit 1120 or contiguous recording formatter at R/W control unit 1210, the placement of these components is flexible and even interchangeable. For example, write start point detector 1222 may be placed at R/W control 1210. Furthermore, these components are illustrated merely as an example for brevity and clarity and that the number and forms of such components may vary as necessitated or desired.

Processes taught by the discussion above may be performed with program code, such as machine-executable instructions, which can cause a machine (such as a "virtual machine", a general-purpose processor disposed on a semiconductor chip, a special-purpose processor disposed on a semiconductor chip, etc.) to perform certain functions. Alternatively, these functions may be performed by specific hardware components that contain hardwired logic for performing the functions, or by any combination of programmed computer components and custom hardware components.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions, to perform the operations. Alternatively, the operations may be performed by a combination of hardware and software.

Furthermore, embodiments of the present invention may be provided as computer program products, which may include an article of manufacture including a machine-readable medium having stored thereon instructions used to program a computer (or other electronic devices) to perform a process according to embodiments of the present invention. The machine-readable medium may include, but is not limited to, floppy diskettes, hard disk, optical disks, CD-ROMs, and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table).

In addition to what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. A method comprising:
    reading existing data recorded on a media;
    determining an append point on the media by determining a signature indicating the append point, the signature including a pattern of stripes of the existing data on the media; and
    contiguously appending new data on the media starting at the append point such that an end pad is eliminated and no intermediate pads are resulted.

2. The method of claim 1, further comprising reading the existing data from one or more matrices located prior to the append point on the media, the media including a magnetic tape.

3. The method of claim 1, wherein the contiguously appending of the new data comprises appending the new data at the append point such that the existing data is preserved through the append point on the media.

4. The method of claim 1, wherein each stripe includes a strip of blocks within a matrix.

5. The method of claim 1, wherein the media comprises matrices to hold the existing data, the media including a magnetic tape.

6. The method of claim 5, wherein each matrix is located next to another matrix such that no gap on the media resulted, the gap including a blank space between records, the records including portions of the existing data.

7. The method of claim 1, wherein the pad comprises a space on the tape having irrelevant data.

8. An apparatus comprising:
- a data processing unit to determine an append point on a media by determining a signature indicating the append point, the signature including a pattern of stripes of the existing data on the media; and
- a control unit, coupled with the data processing unit, the control unit to read existing data recorded on the media, and
- contiguously append data on the media starting at the append point such that an end pad is eliminated and no intermediate pads are resulted.

9. The apparatus of claim 8, wherein the control unit is further to read the existing data from one or more matrices located prior to the append point on the media, the media including a magnetic tape.

10. The apparatus of claim 8, wherein the control unit is further to append the new data at the append point such that the existing data is preserved through the append point on the media.

11. A system comprising:
- a tape drive coupled to a computer system, the tape drive to communicate data with a user via the computer system, the tape drive is further to:
  - determine an append point on a media by determining a signature indicating the append point, the signature including a pattern of stripes of the existing data on the media;
  - read existing data recorded on the media; and
  - contiguously append data on the media starting at the append point such that an end pad is eliminated and no intermediate pads are resulted.

12. The system of claim 11, wherein the tape drive is further to read the existing data from one or more matrices located prior to the append point on the media, the media including a magnetic tape.

13. The system of claim 11, wherein the tape drive is further to append the new data at the append point such that the existing data is preserved through the append point on the media.

14. An article of manufacture comprising a machine-readable media having instructions which when executed, cause a machine to:
- read existing data recorded on a media;
- determine an append point on the media by determining a signature indicating the append point, the signature including a pattern of stripes of the existing data on the media; and
- contiguously append new data on the media starting at the append point such that an end pad is eliminated and no intermediate pads are resulted.

15. The article of manufacture of claim 14, wherein the instructions when executed, further cause the machine to read the existing data from one or more matrices located prior to the append point on the media.

16. The article of manufacture of claim 14, wherein the instructions to contiguously append the new data when executed, further cause the machine to append the new data at the append point such that the existing data is preserved through the append point on the media.

* * * * *